April 3, 1951 E. H. FLETCHER 2,547,861
VARIABLE POSITION CONTROL FOR HYDRAULIC SYSTEMS
Filed Oct. 26, 1949 4 Sheets-Sheet 1

INVENTOR.
E. H. FLETCHER
ATTORNEYS

April 3, 1951  E. H. FLETCHER  2,547,861
VARIABLE POSITION CONTROL FOR HYDRAULIC SYSTEMS
Filed Oct. 26, 1949  4 Sheets-Sheet 2
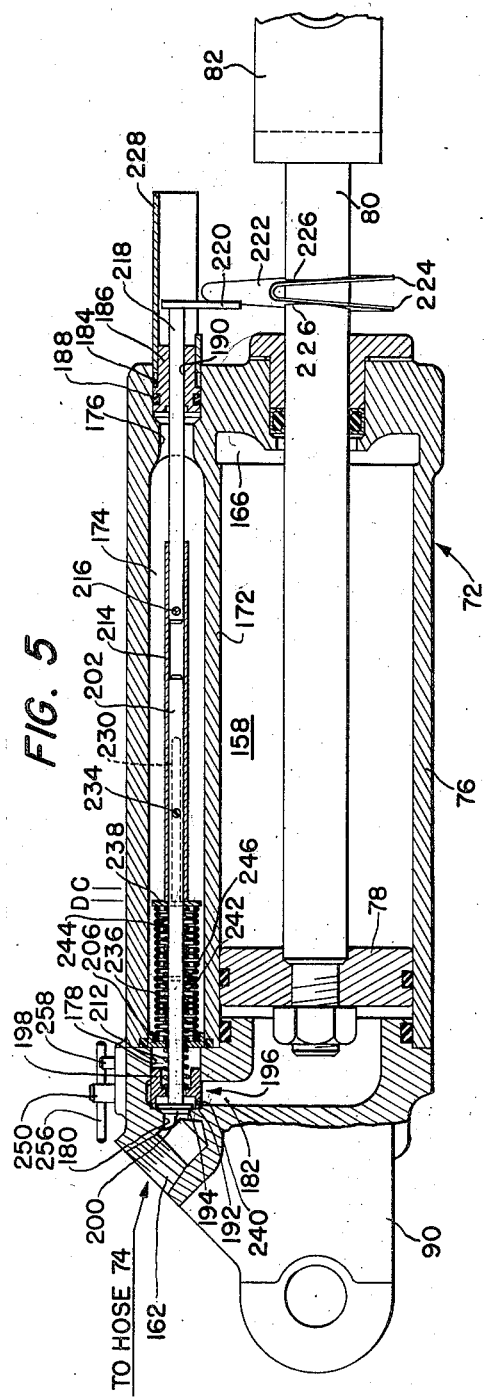
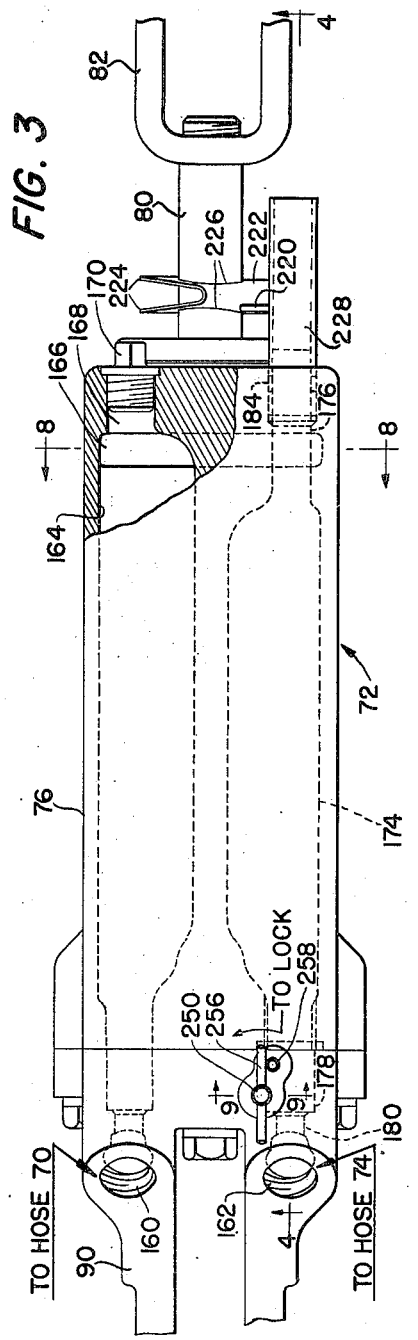
INVENTOR.
E. H. FLETCHER
BY
ATTORNEYS April 3, 1951 E. H. FLETCHER 2,547,861
VARIABLE POSITION CONTROL FOR HYDRAULIC SYSTEMS
Filed Oct. 26, 1949 4 Sheets-Sheet 3

INVENTOR.
E. H. FLETCHER
BY
ATTORNEYS

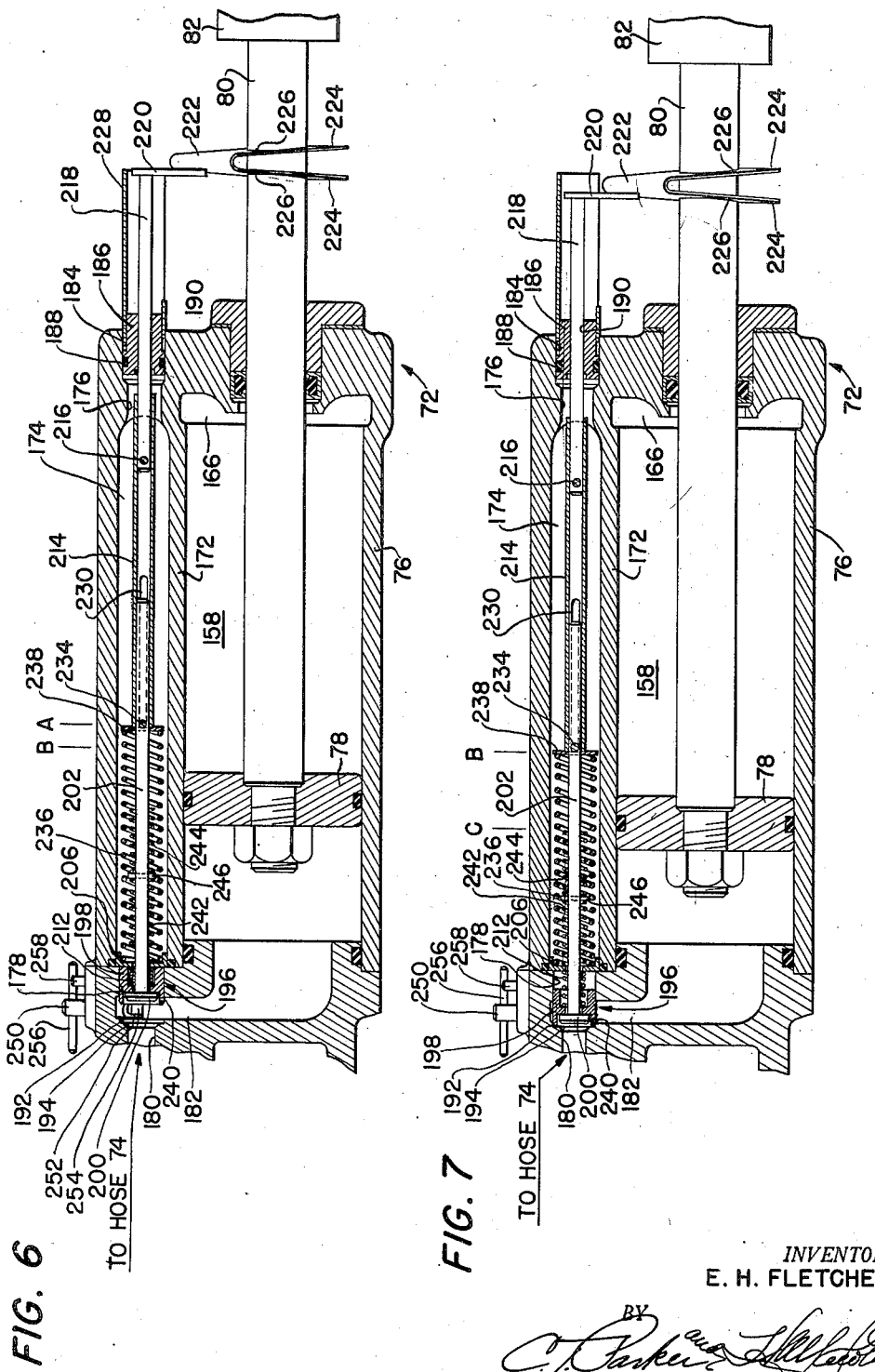

Patented Apr. 3, 1951

2,547,861

UNITED STATES PATENT OFFICE 2,547,861

VARIABLE POSITION CONTROL FOR HYDRAULIC SYSTEMS

Edward H. Fletcher, Waterloo, Iowa, assignor to Deere Manufacturing Co., Dubuque, Iowa, a corporation of Iowa Application October 26, 1949, Serial No. 123,705

14 Claims. (Cl. 121—38)

This invention relates to a hydraulic system and more particularly to means for controlling the extent of relative movement of hydraulically powered parts.

The embodiment of the invention disclosed herein was designed primarily for and finds its greatest utility in connection with the control of adjustable parts of agricultural implements. In the ordinary situation, an agricultural implement, such as a plow, is drawn by a tractor and has a plow bottom adjustable vertically between transport and ground-working positions. The tractor is equipped with a hydraulic pump and distributing valve which form part of a fluid-pressure system including a fluid motor for adjusting the plow. This motor ordinarily takes the form of a cylinder and piston assembly, one end of the cylinder being anchored on the plow frame and the free end of the piston rod being connected to appropriate linkage for raising and lowering the plow.

In the operation of a tractor-plow unit of the type described generally above, it is necessary for the operator to actuate the fluid-pressure system at the end of each furrow to effect raising of the plow bottom from its ground-working position, so that the unit can be turned about and driven over the field to cut an adjacent and parallel furrow. It is desirable in instances such as these that means be provided to enable the operator to lower the plow bottom again to the same ground-working position as before. In the fluid-pressure systems known in the past, it has been customary to provide a stop cooperative between the cylinder and the piston to positively determine the extent of relative movement between the two, and consequently to determine the extent of lowering of the plow bottom to ground-working position. Although stop means such as this is generally satisfactory, it is found in some circumstances that it is desirable or necessary to lower the plow bottom to an extent greater than its previous working depth. If the stop means is rigidly although adjustably fixed, the desirable variation can be accomplished; however, this requires that the operator dismount from the tractor and make the necessary adjustment, after which he must make the necessary readjustment.

According to the present invention, an improved hydraulic system is provided which has a limit or control means that may be adjusted by the operator by means of the control lever for the distributing valve, which is located convenient to him on the tractor. Primarily, the invention resides in a valve for controlling the flow of fluid to or from the chamber of the fluid-pressure cylinder, so that when the system reaches a predetermined point in its stroke, the valve is partially closed to an extent sufficient to permit throttling action which so restricts the passage as to create an abnormal rise in pressure, with the result that the safety or pressure-relief valve of the system is caused to operate, whereupon the distributing valve control lever is returned to neutral and fluid pressure is no longer transmitted to the cylinder. Inasmuch as the closing action of the valve is not positive; that is, the valve does not completely close the passage, there is a restricted passage through which fluid may flow at a reduced rate. Therefore, the operator can again move his control valve to operating position and thus allow the system to circulate fluid at such reduced rate, thereby allowing further relative movement between the cylinder and piston in the same direction but at a lower speed.

A further object of the invention is to incorporate in the valve means for completely or positively closing the passage after a predetermined extent of relatively low-speed movement between the cylinder and piston so that after such predetermined amount of travel, a positive stop between the cylinder and piston is effected.

It is a further object of the invention to provide stop or lock-out means for the purpose of nullifying the action of the intermediate stage of the valve; that is, that stage of the valve in which the passage is merely restricted or throttled but not closed, so that the operator, if he so desires, may eliminate the slow-speed overtravel beyond the setting of his adjustable stop.

The invention has for a further feature the provision of improved valve means of the character specified which is so constructed and designed as to require a minimum of modification in hydraulic systems of existing types.

Other objects and important features inherent in and encompassed by the invention will become apparent to those versed in the art as a complete disclosure of a preferred embodiment of the invention is made in the following detailed description and accompanying sheets of drawings, in which:

Figure 3 is an enlarged top plan view of the cylinder and piston assembly, with a portion of the cylinder being broken away to disclose one of the fluid passages therein;

Figure 5 is a longitudinal sectional view taken substantially on the line 5—5 of Figure 4, showing the piston in its fully retracted position;

Figures 6 and 7 are longitudinal sectional views similar to Figure 5 but showing the piston in different positions and likewise showing different positions of the components of the control means;

Figure 1:
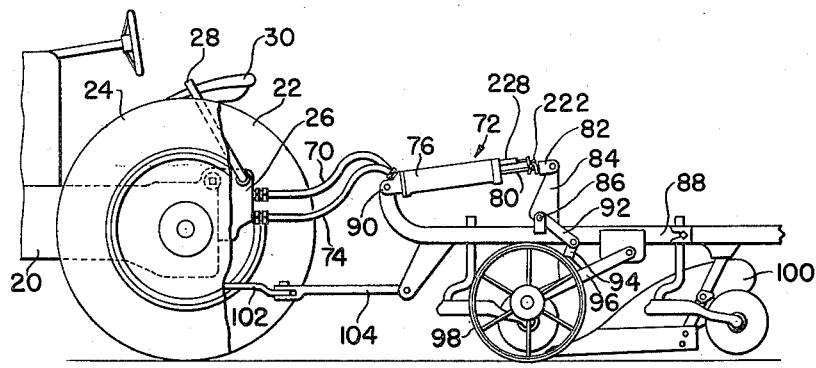
Figure 1 is a partial side elevational view of a tractor and attached plow equipped with a hydraulic system having the components as outlined above.
Figure 2:
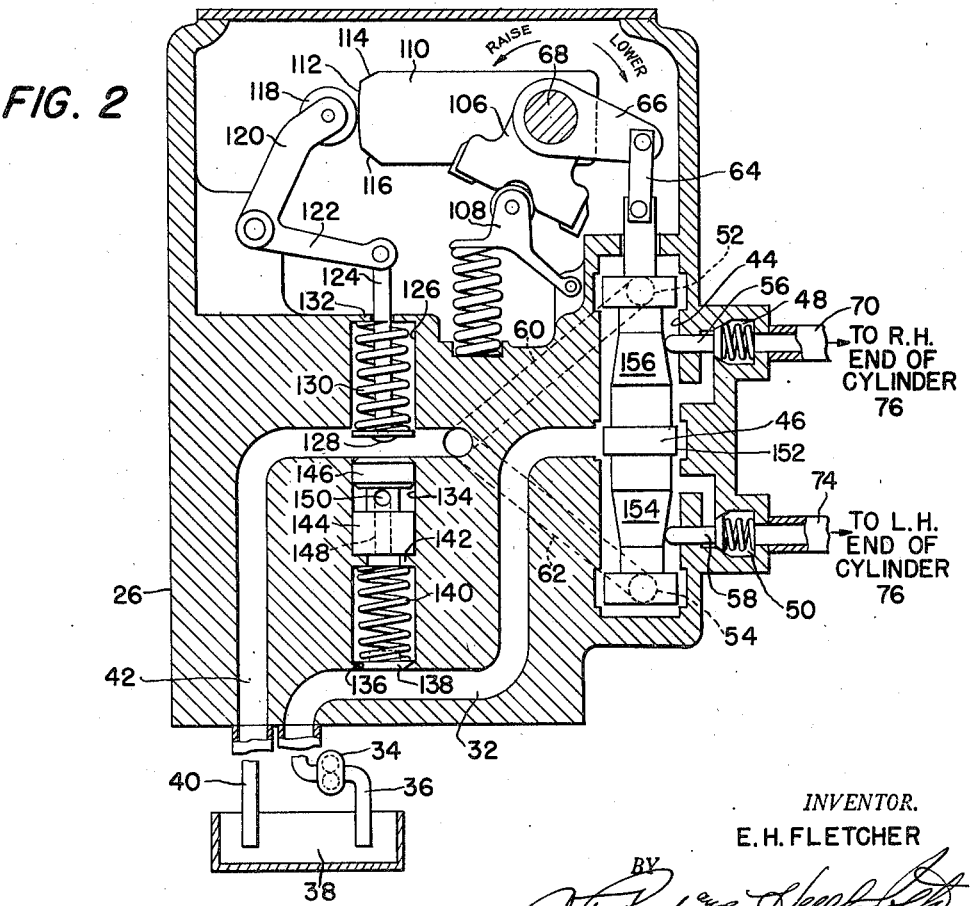
Figure 2 is an enlarged sectional view of one type of distributing valve for the hydraulic system.
Figure 4:
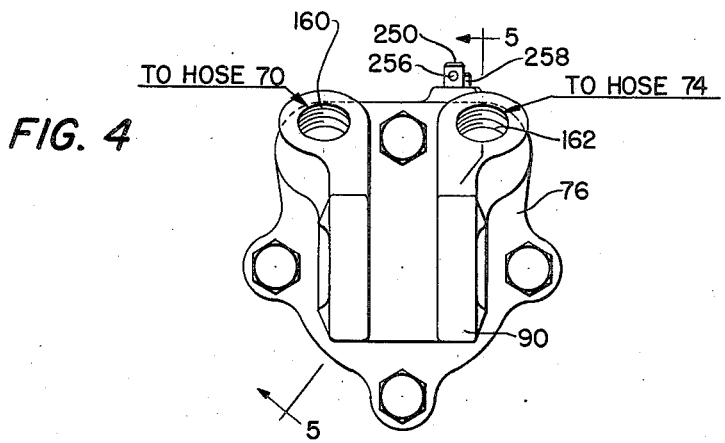
Figure 4 is an end elevational view from the left-hand end of the cylinder illustrated in Figure 3.

*Hydraulic system in general—Figures 1 and 2*

As mentioned above, the embodiment of the invention disclosed herein was designed primarily for use with an agricultural unit of the type including a power vehicle and an implement having an adjustable part. It will be understood, of course, that the invention has wider application. Further, the specific illustration of tractor and attached plow is merely representative of one of the several applications of which the invention is capable. Therefore, the present disclosure should be taken as illustrative and not limiting.

The tractor illustrated in Figure 1 is typical of a conventional tractor and has a longitudinal body 20 carried on right- and left-hand traction wheels 22 and 24, a portion of the left-hand wheel being broken away to expose a distributing valve 26 which forms part of a hydraulic or equivalent fluid-pressure system. The distributing valve is operated by a control lever 28 which is convenient to an operator's seat 30 on the tractor.

Referring now to Figure 2, it will be seen that the distributing valve 26 comprises a casing having a high-pressure or inlet passage 32 which is supplied with fluid under pressure by means of a circulating pump 34. This pump has an intake 36 connected to a reservoir 38. The reservoir in turn communicates through a line 40 with a low-pressure passage 42 in the distributing valve 26.

The distributing valve casing is provided with a vertical valve bore 44 within which is carried a shiftable valve 46. The valve bore 44 communicates intermediate its ends with the high-pressure passage 32 and the valve 46 is operative to effect control of a pair of motor ports 48 and 50 and a pair of exhaust ports 52 and 54. The motor ports 48 and 50 are provided respectively with spring-loaded check valves 56 and 58. The exhaust ports 52 and 54 are respectively connected by branch passages 60 and 62 with the low-pressure passage 42.

The valve 46 is shiftable selectively in opposite directions vertically in the valve bore 44 by means of linkage 64 connected to an arm 66 fixed to a rockshaft 68. This rockshaft extends at one side of the distributing valve and is fixed to the lower end of the control lever 28. The upper motor port 48 is connected by a fluid-pressure-transmitting means including a hose 70 to one end of a fluid-pressure motor designated generally by the numeral 72. The lower motor port 50 is similarly connected by a hose 74 to the motor 72. The motor has first and second members, here respectively in the form of a cylinder 76 and piston 78 (Figures 5, 6 and 7). The interior of the cylinder member is provided as a chamber to which fluid may be supplied or from which fluid may be exhausted to effect back and forth movement of the piston 78. The member comprising the piston 78 further includes an external part in the form of a piston rod 80, the free or outer end of which has a clevis 82 for effecting connection to a rockable arm 84 pivoted at 86 on a plow frame 88. The closed end of the cylinder 76 has a clevis 90 which is anchored to the plow frame 88.

The rockable arm or member 84 is in the form of a bell crank having a second arm 92 which is connected by a link 94 to a crank axle 96 on which is journaled a ground-engaging wheel 98. The plow frame carries a plow bottom 100, shown in a transport position in Figure 1.

From the description thus far it will be seen that relative extension of the cylinder 76 and piston rod 80 will effect clockwise rocking of the bell crank member 84—92 and will consequently raise the plow frame 88 and plow 100 relative to the ground-engaging wheel 98. Substantially full extension of the piston rod 80 is illustrated in Figure 1.

Conversely, retraction of the piston rod 80 within the chamber of the cylinder 76 will effect counterclockwise rocking of the bell crank 84—92 and thus accomplish lowering of the plow bottom to a selected ground-working position.

As will be hereinafter brought out in greater detail, the upper hose transmits fluid under pressure from the distributing valve 26 to the right-hand end of the cylinder 76 for effecting retraction of the piston rod 80 and consequently lowering of the plow bottom 100. During this phase of the operation of the system, fluid is exhausted from the left-hand end of the cylinder 76 via the lower hose 74 and ultimately through the branch passage 62, low-pressure passage 42, line 40 and to the reservoir 38. When the fluid-pressure flow is reversed, fluid under pressure is supplied through the lower hose 74 to the left-hand end of the cylinder 76 for effecting extension of the piston rod and consequently raising of the plow bottom 100. At the same time, the upper hose 70 becomes a medium for transmitting fluid exhausted from the right-hand end of the cylinder back through the distributing valve casing to the reservoir 38.

The connection of the plow frame 88 to the tractor for travel of the two together is effected by a hitch including a drawbar 102 on the tractor and a draft member 104 on the plow, as is generally conventional.

The distributing valve illustrated is of the type in which the main control valve is automatically returned to neutral position upon the occurrence of an abnormal pressure rise in the system. The neutral position of the valve 46 is illustrated in Figure 2. The rockshaft 68 has fixed thereto a centrally notched plate 106 which has its central or neutral position established by a spring-loaded arm and roller means 108. The rockshaft 68 has also fixed thereto a radially extending plate 110 having an arcuate edge 112 formed about the axis of the rockshaft. The arcuate edge terminates at its opposite ends in cut-off corners 114 and 116, In the neutral or central position of the plate 110 as illustrated in Figure 2, the arcuate edge 112 is engaged by a roller 118 carried on one arm 120 of a bell crank having a second arm 122. A rod 124 depends from the free end of the bell crank arm 122 into a vertical bore 126 and is headed at 128 to confine one end of a coiled compression spring 130, the other end of which is retained by a radial wall portion 132 at the upper end of the bore 126.

The bore 126 intersects the low-pressure passage 42 and is coaxial with a second bore 134 which intersects the passage 42 and further intersects the high-pressure passage 32. The lower end of the bore 134 is provided with a valve seat 136 normally closed by a valve 138 biased to closed position by a coiled compression spring 140. The bore 134 is divided into upper and lower portions by an intermediate, apertured, radial wall 142 above which is carried a valve 144. This valve is headed at 146 and has an axial passage 148 opening at the lower end of the valve and a communicating radial passage 150 opening below the head 146.

In order to effect lowering of the plow bottom 100 to ground-working position, the rockshaft is moved rearwardly from its position shown in Figure 1, thus effecting clockwise rocking of the rockshaft 68. This is followed by downward movement of the valve 46. An enlarged intermediate portion 152 on the valve 46 cuts off the lower portion of the valve bore 44 from communication with the high-pressure passage 32 and establishes high-pressure communication between the passage 32 and the upper motor port 48. A lower tapered portion 154 on the valve 46 simultaneously effects opening of the lower check valve 58. Exhaust fluid returning through the hose 74 and motor port 50 may return to the reservoir via the exhaust port 54, the branch passage 62, the low-pressure passage 42 and line 40.

When the control lever 28 is moved forwardly to effect counterclockwise rocking of the rockshaft 68, the valve 46 moves upwardly in the valve bore 44 and the valve portion 152 cuts off the upper portion of the valve bore so that fluid under pressure is transmitted through the lower motor port 74 to the motor 72. Simultaneously, a tapered portion 156 at an upper portion of the valve 46 opens the check valve 56 for the motor port 48. Exhaust fluid returning through the hose 70 and motor port 48 finds its way to the reservoir through the exhaust port 52, the branch passage 60, low-pressure passage 42 and line 40.

The main control valve 46 is maintained in either its "raise" or "lower" position by means of the roller 118 on the bell crank 120—122 and is urged toward neutral position by the spring-loaded arm and roller 108. For example, when the rockshaft 68 is rocked in a clockwise direction to move the valve 46 downwardly, the notched plate 106 moves so that the end of the plate rather than the notch engages the roller on the arm and roller means 108. At the same time, the arcuate edge 112 on the plate 110 departs from the roller 118 and the cut-off corner 116 engages this roller. The spring-loading effected by the compression spring 130 maintains the roller 118 in engagement with the cut-off corner 116, and thus maintains the position of the main control valve 46. Now, should there occur an abnormal rise in pressure in the system, the relief valve 138 is unseated and fluid flowing upwardly through the bore 134 raises the valve 144 to an extent sufficient to by-pass fluid pressure through the passages 148 and 150 to the low-pressure passage 42; at the same time the head 146 of the valve 144 engages the headed end 128 of the rod 124. This action moves the rod upwardly against the loading of the spring 130 and releases engagement between the roller 118 and the cut-off corner 116 on the plate 110. The spring-loaded arm and roller means 108 is constantly urging the plate 106 (and consequently the rock-shaft 68) to the intermediate or central position of Figure 2. Hence, the arm and roller means 108 is operative to return the rock-shaft and hence the control valve 46 to neutral position, whereupon fluid may circulate idly through the system at no appreciable pressure. At the same time, the two check valves 56 and 58 close and maintain the position of the piston 78 relative to the cylinder 76.

*Fluid motor and control thereof—Figures 3 to 11*

The cylinder or first motor member 76 has an interior chamber 158 within which the piston 78 of the second motor member is axially reciprocable, and which is provided with appropriate passages for supplying fluid to or exhausting fluid therefrom at opposite ends. As best shown in Figure 3, the left-hand end of the cylinder 76 is provided with first and second interiorly threaded openings 160 and 162. The passage of which the opening 160 forms a part includes an elongated cored passage portion 164 which runs lengthwise of the upper portion of the cylinder. This passage portion communicates at the right-hand end of the cylinder with a generally annular groove 166 which is in part concentric with the cylinder chamber 158. The coring of the passage portion 164 is facilitated by the provision of an opening 168 at the right-hand end of the cylinder. This opening is tapped and receives a closure plug 170.

Figure 8:
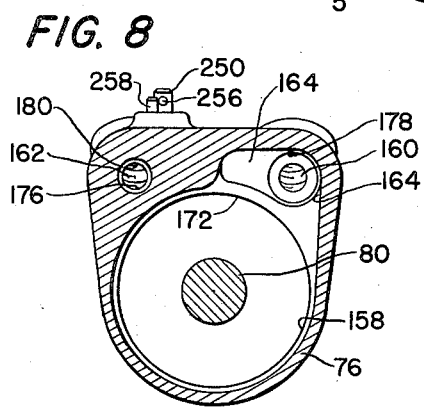
Figure 8 is a transverse sectional view taken on the line 8—8 of Figure 3.
Figure 9:
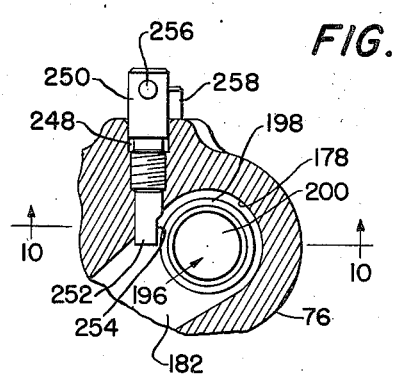
Figure 9 is an enlarged transverse sectional view taken on the line 9—9 of Figure 3.
Figure 10:
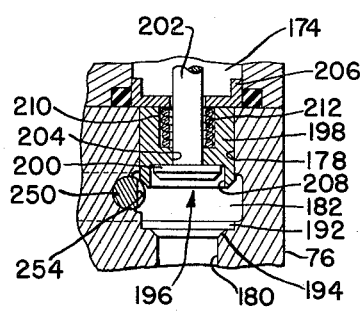
Figure 10 is a fragmentary sectional view taken on the line 10—10 of Figure 9.

Except for the communication at 166, the passage portion 164 is separated from the cylinder chamber 158 by an upper cylinder wall portion 172 (Figure 8). This wall portion is of substantial thickness and is cored lengthwise thereof to provide a housing portion 174 which opens at the right-hand end of the cylinder as a communicating bore 176 and which opens at the left-hand end of the cylinder as a communicating bore 178 which in turn communicates through a reduced counterbore 180 with the opening 162 to which the hose 74 is connected. The passage portion comprising the bore 180 includes as an extension thereof a further passage portion 182 which communicates with the left-hand end of the cylinder chamber 158 (Figures 5, 6 and 7).

The bore portion 176 at the other end of the housing or chamber 174 is slightly enlarged at 184 and is fitted with a coaxial bushing 186. This bushing has an appropriate annular external seal 188 and is further provided with an axial bore 190.

The passage portion comprising the bore 180 communicates with the passage portion 182 through first and second concentric valve seats 192 and 194. Valve means comprising a valve unit, designated generally by the numeral 196, is carried by the cylinder member 76 in the upper portion thereof for axial movement back and forth in the bore 178. The valve unit 196 controls the flow of fluid pressure through the passage or bore 180 and includes first and second or inner and outer valves 198 and 200. The valve 200 forms a head on one end of a rod 202 which comprises part of a first control element to be subsequently described in greater detail. The rod 202 extends lengthwise or axially of the housing or small chamber 174 and passes axially slidably through a central aperture 204 in the first valve 198 and also loosely through a centrally apertured, externally flanged washer 206 fixed in the housing or chamber 174 adjacent the junction thereof with the bore 178. That portion of the valve 198 proximate to the valve seats 192 and 194 is provided with a counterbore 208 of larger diameter than the bore 204. This counterbore provides a circular recess which receives or surrounds the valve 200. The opposite side of the valve 198 is provided with a counterbore 210 within which is received a first biasing means in the form of a relatively light coiled compression spring 212. This spring acts between the flanged washer 206 and the interior of the valve 198 and normally biases or urges the valve 198 to the left, or in the direction in which it moves to seat on the valve seat 192.

The valve seat 192 is of larger diameter than the valve seat 194, which accords with the larger diameter of the left-hand end of the valve 198 over that of the valve 200, so that the valves respectively seat on the seats 192 and 194.

The rod 202 extends lengthwise of the passage or chamber 174 and has the end portion thereof opposite the valve 200 axially slidably received in a hollow or tubular member 214 which comprises another part of the control element including the rod 202. The opposite end of the tubular member 214 is pinned at 216 to a coaxial rod 218 which extends axially slidably and outwardly through the bore 190 in the bushing 186. The outer or external end of the rod 218 has fixed thereto a depending arm 220 which is positionable to be engaged by a second control element in the form of an adjustable clip member 222 fixedly carried on the external part of the piston rod 80. The clip 222 is of the spring type and is of U-shape, having a pair of legs 224 apertured at 226 to receive the piston rod 80. The legs 224 may be squeezed together so that the clip may be moved axially of the piston rod. When the legs 224 are released, the clip binds itself to the piston rod 80 and thus provides an adjustable limit stop which, once set, moves axially with the piston rod and reflects back and forth movement of the piston 78 within the chamber 158 of the cylinder 76. The clip 222 may be set at any predetermined desired position on the piston rod 80 so as to engage the arm 220 on the control element 202—214—218 for effecting operation of the valve 196 in accordance with the extent of travel of the piston 78. In the present instance, the valve 196 is effective to control the exhaust of fluid pressure through the passage 182—180 as the piston 78 moves to the left. Having regard to the specific illustration of tractor and plow shown in Figure 1, the control elements 222 and 202—214—218 are effective to control the valve 196 with respect to lowering of the plow bottom 100. As will be hereinafter brought out in greater detail, a predetermined setting of the clip or control element 222 is effective to cause lowering of the plow bottom to a preselected ground-working position. At the same time, overtravel of the piston 78 in the same direction (to the left) may be had without affecting the setting of the control element or clip 222.

The right-hand end of the cylinder 76 carries a shield 228 which protects the exposed or projecting end of the rod 218. This shield is elongated and is coaxial with the bore 184, its inner end being fixed to the cylinder by being carried in this bore. The shield is of arcuate cross-section to at least partially enclose the rod 218. In so far as the present invention is concerned, the shield 228 may be of any other type or may be omitted.

Figure 11:
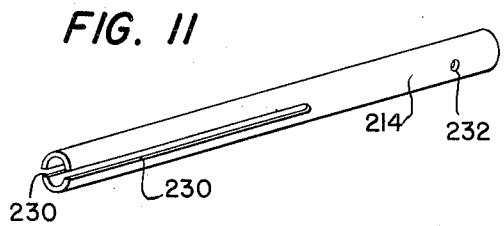
Figure 11 is a perspective view showing one of the control parts.

Figure 11 shows a detail view of the tubular or hollow member 214. It will be seen that the inner end of the member is provided with a pair of diametrically opposed, lengthwise slots 230 and the opposite end portion has a transverse opening 232 for receiving the pin 216 which effects the connection between the member 214 and the rod 218. The function of the slot 230 is to accommodate a transverse pin 234 which extends crosswise of the rod 202 intermediate the ends of the rod. A coiled compression spring 236 encircles the rod 202 between the flanged washer 206 and a washer 238 that abuts both against the pin 234 and the inner end of the hollow member 214. The spring 236 comprises second biasing means substantially stronger than and acting in opposition to the biasing means or relatively light spring 212. Hence, the spring 236 operates through the washer 238 and pin 234 to urge the rod 202 normally to the right. Since the valve 200 forms a head on the left-hand end of the rod 202, and since this head engages the valve 198, the spring 236 serves also to move the valve 198 to the left, overcoming the action of the relatively light spring 212. The relationship between the valve 200, serving as a head on the rod 202, and the valve 198 is effective to establish a one-way connecting means between the two valves so that the two may move together in one direction and may move separately in the opposite direction.

From the description thus far, it will be seen that the valve 196 is normally held in an open or initial position by means of the biasing means comprising the compression spring 236. Since the washer 238 at the right-hand end of the spring 236 abuts the inner end of the tubular member 214, the spring is likewise effective to maintain the control rod 218 in its outwardly projected position. The rod 202 is, of course, maintained in its position toward the right as an incident to opening of the valve 196. Assuming now that the piston rod 80 is fully extended—or moved a maximum distance to the right—in accordance with raising of the plow bottom 100 to its transport position, the control arm 220 on the rod 218 will occupy substantially the position illustrated in Figure 6. The second control element or clip 222 will be spaced from the control arm 220 as in Figure 1. Now, as the control lever 28 is moved rearwardly to rock the rockshaft 68 in a clockwise direction for effecting downward movement of the valve 46, fluid under pressure is transmitted from the high-pressure passage 32, through the upper motor port 48, through the upper hose 70 and through the passage 160—164—166 to the right-hand end of the cylinder 76. The increased volume and pressure of fluid at the right side of the piston 78 causes the piston to move to the left, thus exhausting fluid at the left-hand side of the piston through the passage 180—182 for ultimate return to the reservoir 38. After the piston has traveled through a range or extent determined by the setting of the control element or clip 222, the latter contacts the control arm 220 on the rod 218. This is the position illustrated in Figure 6. To further facilitate an understanding of the construction, the legend A has been used in Figure 6 to indicate an initial position of the washer 238. At this stage of the operation, the compression spring 236 is fully extended and maintains the valve 196 in its initial or passage-opening position. Hence, the passage 180—182 is still open for the transmission of fluid exhausted from the left hand end of the cylinder.

As the piston continues to move to the left, the clip or control element 222 operates through the control arm 220 to move the rod 218 and tubular member 214 to the left and, since the inner end of the tubular member 214 abuts the washer 238, the spring 236 is compressed. This action modifies the biasing action of the spring 236 to the extent that the valve-actuating spring 212 is no longer overcome, whereupon the spring 212 can shift the valve 198 to the left, carrying along with it the valve 200 and rod 202. The action just described takes place during that range of leftward piston travel reflected by the distance between the letters A and B in Figure 6, giving the result illustrated in Figure 7, wherein the letter B again indicates the position of the washer 238 after the spring 236 has been compressed sufficiently to allow the spring 212 to move the valve 196 to the left to what may be termed an intermediate position. The rod 202 is not positively moved by the hollow member 214, since the transverse pin 234 is loosely received in the slots 230 in the member 214.

In this intermediate position of the valve 196—that is, with the valve 198 seating on the valve seat 192 while the valve 200 is unseated from the seat 194—transmission of fluid from the left-hand end of the chamber 158 of the cylinder 76 is not completely cut off through the passage 182—180, since the valve 198 is provided with a restricting or throttling orifice 240 which communicates from the exterior of the valve 198 to the circular recess provided by the counterbore 208 in the valve 198. The orifice thus serves as a restricting or throttling passage communicating the passage 182 and the passage 180 via the valve seat 194. The restriction thus set up is sufficient to create an abnormal rise in pressure in the system, with the result that the pressure-relief valve 138 is caused to unseat, which action is followed by release of the plate 110 by the roller 118 so that the control valve 46 may automatically return to its neutral position. The check valves 56 and 58 close and the motor 72 is isolated from the distributing valve 26. Thus, the position of the plow bottom 100 achieved by stopping the piston 78 is hydraulically fixed.

Inasmuch as the intermediate position of the valve 196 does not establish a complete blockade at the passage 180—182, the system is operative for overtravel of the piston 78 to the left of the position shown in Figure 7. This overtravel is useful in further lowering of the plow bottom 100 and may be accomplished according to the present invention without disturbing the setting of the control element or clip 222. The operator again moves the control lever 28 rearwardly and holds it in this position, again shifting the main valve 46 for transmission of fluid under pressure through the upper motor port 48 to the right-hand end of the cylinder and at the same time opening the lower check valve 58 for exhaust of fluid from the left-hand end of the cylinder through the hose 74 and motor port 50. Manual pressure on the control lever 28 is sufficient to maintain the valve in this position, notwithstanding action of the pressure-relief valve 138 and associated mechanism 108 and 110—118. Even though there is an abnormal rise in pressure in the system, maximum pressure is still available at the high-pressure passage 32 for transmission to the right-hand end of the cylinder. In view of the restriction or throttling action at 240, movement of the piston 78 further to the left will be at a relatively lower speed than before. Nevertheless, the increased movement desired is often relatively small and the slow speed at which it is effected is not a material disadvantage.

It is another feature of the invention to provide means for positively limiting the extent of overtravel of the piston 78. In the present case, the means for effecting this result comprises delayed-action means including a pair of coiled compression springs 242 and 244 encircling the rod 202 intermediate the flanged washer 206 and abutment washer 238 and disposed respectively at opposite sides of a fixed transverse pin 246 carried by the rod 202. In both of the positions shown in Figures 6 and 7, both springs 242 and 244 are relaxed and the right-hand end of the spring 244 is spaced a substantial axial distance to the left from the abutment washer 238. The springs 242 and 244 have no effect whatsoever on the action of the control mechanism up to the point illustrated in Figure 7.

As slow-speed overtravel of the piston 78 is achieved, the control element or clip 222 continues its pressure on the control rod 218 which in turn transmits pressure against the washer 238 to compress the spring 236 substantially to the point C in Figure 7. As the tubular member 214 moves inwardly to act through the washer 238 to compress the spring 236, the fixed transverse pin 234 in the rod 202 is received by the lengthwise slots 230 in the member 214. Hence, there is no positive action on the rod 202 by the member 214. However, as the washer 238 is moved to the point C in Figure 7, the washer picks up the right-hand end of the small spring 244 and continued movement of the piston 78 to the left, accompanied by continued movement of the washer 238 to the left, transmits pressure through the spring 244 to the pin 246. Since the latter is fixed to the rod, there is now a connection including cushioning means between the washer 238 and the rod 202. This connection is sufficient to cause the rod 202 to be shifted to the left so that the valve 200 completely closes or seats on the valve seat 194. This establishes a final position of the valve 196 to completely block the passage 182—180 against the transmission of fluid from the chamber 158 back to the reservoir 38.

In view of the complete blockade established by the final or passage-closing position of the valve 196, there is again created in the system an abnormal rise in pressure which actuates the relief valve 138. Since the piston 78 is now hydraulically locked, the available pressure cannot move it further to the left. The action of the relief valve at this time is audible to the operator and he will thereupon release the control valve for return to neutral position.

Although movement of the valve 200 to its final, passage-closing position by the means just described will effect compression or loading of the second spring 242, this spring is not effective to shift the control rod again to the right as long as the clip 222 engages the arm 220 at the outer end of the rod 218. The final position of the valve is illustrated in Figure 5, showing movement of the washer from position C to position D to compress the springs 244 and 242. It will be understood, of course, that overtravel of the piston 78 is from the position shown in Figure 7 to that shown in Figure 5, a distance reflected by the travel of the washer 238 from position C to position D.

When it is desired to reverse the flow of fluid pressure for the purpose of raising the plow bottom from its ground-working position to its tranport position, the operator moves the control lever 28 forwardly, raising the main valve 46 for transmission of fluid under pressure through the hose 74 to the left-hand end of the cylinder 76. Fluid pressure against the face of the valve 200 easily opens this valve against further compression of the spring 244, assisted by action of the spring 242. As the valve 200 moves to the right, it picks up the valve 198 and moves it against the relatively light pressure of the spring 212. By this time, fluid has entered the passage 182 and begins to move the piston 78 to the right, thus releasing pressure of the clip or control element 222 against the rod 218. Ultimately, the parts are restored to the positions illustrated in Figure 6, the control element 202—214—218 stopping substantially at the position indicated while the piston rod 80 and control element 222 are capable of moving further to the right, as in Figure 1.

A still further feature of the invention is the provision of means for locking out the valve 198 so that the system may function entirely on the basis of the positive blockade or passage-closing action of the valve 200. The components of this means are best illustrated in Figures 3, 4, 9 and 10.

The left-hand end of the cylinder 76 is provided with a vertical bore 248, an intermediate portion of which is threaded to receive rotatably therein a stop or lock-out member 250. This member has a lower end 252 which is milled off at 254 to provide a flat. The upper end of the member 250 projects above the upper level of the cylinder and is equipped with a handle 256 by means of which the member may be rotated in the bore 248. A stop pin 258 is provided at the upper portion of the cylinder for engagement from one side or the other thereof by the handle portion 256 to determine the "on" or "off" positions of the member 250.

The drawings illustrate the unlocked position of the member 250. In this position, the flat 254 is parallel to the direction of movement of the valve 198 and hence is out of the path of movement of this valve. This position of the member 250 is determined by engagement of the handle 256 with one side of the stop pin 258. When the handle 256 is rotated in the direction indicated in Figure 3, until the other portion of the handle engages the other side of the pin 258, the flat 254 is disposed transverse to the path of movement of the valve 198. Hence, the portion of the member 250 of increased diameter is interposed in the path of movement of the valve 198 as an obstruction to movement thereof. However, this portion of the member 250 does not interfere with operation of the valve 200. Hence, as the piston 78 moves to the left and the control element or clip 222 engages the arm 220 on the control rod 218, loading of the spring 236 by the washer 238 is not followed by extension of the spring 212, since the valve 198 is retained by the lock member 250. Therefore, the intermediate phase of operation of the valve 196 is temporarily and effectively eliminated. Since the lock-out does not affect the valve 200, functioning of this valve will occur as previously described.

Summary

The improved control valve mechanism for the hydraulic system provided according to the present invention achieves all the desirable results obtainable by mechanism heretofore known; that is, there is provided means for limiting the travel of one motor member relative to another by the utilization of a selectively settable stop effective to operate a valve for the purpose of creating an abnormal rise in pressure in the hydraulic system. At the same time, overtravel of one motor member relative to the other is obtainable because of the leakage or throttling provided by the intermediate position or phase of operation of the valve 196. Of further importance is the ultimate positive blockade of the passage by the valve 196 in its final, passage-closing position. The user of a system equipped with valve mechanism constructed according to the principles of the present invention is thus able to achieve overtravel within a limited range, which is of particular importance when the user knows precisely the extent of overtravel that can be obtained. For example, in the present instance the amount of overtravel possible is one and one-half inches (the drawings are approximately half scale). Thus, the operator knows that his adjustment of an implement or equivalent part beyond the position he has preselected will not be excessive to the point of creating a dangerous or harmful condition.

Further objects and features of the invention not specifically enumerated above will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. A fluid-pressure control system, comprising: a first member having a chamber and means providing a passage for the flow of fluid to and from the chamber; a second member having an internal part movable back and forth in the chamber, and an external part outside the chamber and connected to and reflecting movement of the internal part; valve means in the first member for controlling flow of fluid pressure through the passage, including a first valve movable between a passage-opening position and a passage-throttling position, and a second valve movable between a passage-opening position and a passage closing position; first means biasing the first valve toward passage-restricting position; second means of greater strength than the first means, for biasing the second valve to passage-opening position; one-way connecting means between the valves effective to cause opening movement of the first valve upon opening movement of the second valve by the second biasing means; a first control element carried by the first member and engageable by the second valve for movement in one direction under action of the second biasing means, and movable in the opposite direction in opposition to the second biasing means; a second control element fixed to the external part of the second member to reflect back and forth movement thereof and engageable with the first control element to move the latter in said opposite direction to overcome said second biasing means so that the first biasing means is effective to move the first valve to passage-throttling position; and delayed action means operative between one of the control elements and the second valve and effective to move the second valve to passage-closing position upon continued same-direction movement of said one control element.

2. The invention defined in claim 1, further characterized in that: means is carried by the first member for preventing passage-throttling action of the first valve so that the passage may be either completely opened or completely closed by the second valve alone, comprising a movable lock element selectively shiftable into or retractible out of the path of movement of said first valve.

3. The invention defined in claim 1, further characterized in that: the passage has first and second concentric valve seats, the first being of larger diameter than the second; the first and second valves are coaxial with the seats and respectively of larger and smaller diameters according to said seats; the first control element comprises a rod fixed to and extending axially from the second valve in a direction away from the valve seats; and the first valve has a central opening therein through which the rod is axially slidable, said second valve serving as a head on the valve-seat end of the rod effective to engage the first valve to form the aforesaid one-way connecting means between the valves.

4. The invention defined in claim 3, further characterized in that: the first biasing means comprises a spring encircling the rod and effective between the first member and the first valve; and the second biasing means comprises a stronger spring encircling the rod and effective between the first member and the rod and opposed to the first spring.

5. The invention defined in claim 4, further characterized in that: the first member has an apertured part fixed thereto and axially spaced from the valve seats and through which the rod is axially slidable; the first spring is at one side of said apertured part and operates between said apertured part and the first valve; and the second spring is at the other side of said apertured part and operates between said apertured part and an abutment member on the rod.

6. The invention defined in claim 5, further characterized in that: the first control element includes a hollow member arranged in coaxial telescopic relation to the rod and having an inner end portion engaging and opposing the second spring, and having an outer end portion engageable by the second control element; and said inner end portion of the hollow member being formed to accommodate the abutment member on the rod so that the hollow member may have axial movement toward the valve seats relative to the abutment member.

7. The invention defined in claim 6, further characterized in that: the aforesaid delayed-action means comprises a stop device on the rod intermediate the abutment member and the apertured part and engageable by the inner end of the hollow member subsequent to a predetermined amount of axial travel of the hollow member toward the valve seats.

8. The invention defined in claim 7, further characterized in that: the stop device includes a cushioning element to absorb impact of the inner end of the hollow member on the rod incident to closing of the second valve.

9. The invention defined in claim 8, further characterized in that: the stop device further includes energy-storing means normally unloaded but capable of being loaded by closing of the second valve for biasing the second valve subsequently toward opening position when axial pressure on the rod via the hollow member is released.

10. The invention defined in claim 9, further characterized in that: the rod has a fixed element thereon intermediate the apertured part and the inner end of the hollow member; the energy-storing means is a coiled compression spring encircling the rod between the apertured part and the fixed element, and the cushioning means is another coiled compression spring encircling the rod between the fixed element and the inner end of the hollow member.

11. A fluid-pressure control system, comprising: a first member having a chamber and means providing a passage for the flow of fluid to and from the chamber; a second member having an internal part movable back and forth in the chamber, and an external part outside the chamber and connected to and reflecting movement of the internal part; valve means in the first member for controlling flow of fluid pressure through the passage, including a valve unit movable from an initial, passage-opening position to an intermediate, passage-throttling position and subsequently to a final, passage-closing position; first biasing means normally urging the valve unit to its intermediate position; second biasing means normally urging the valve unit to its initial position and constructed and arranged to overcome the bias of the first biasing means; and control means interconnecting the valve and the second member for actuating the valve sequentially from initial to intermediate to final position in response to movement of the second member in one direction, including a control element operative upon predetermined movement of the second member in said direction to modify the bias of the second biasing means so that the first biasing means is effective to move the valve unit to its intermediate position, and further including delayed-action means operative after a predetermined extent of further movement of the second member in the same direction to effect movement of the valve unit from its intermediate position to its final position.

12. A fluid-pressure control system, comprising: a first member having a chamber and means providing a passage for the flow of fluid to and from the chamber; a second member having an internal part movable back and forth in the chamber, and an external part outside the chamber and connected to and reflecting movement of the internal part; valve means in the first member for controlling flow of fluid pressure through the passage, including a valve unit movable from an initial, passage-opening position to an intermediate, passage-throttling position and subsequently to a final, passage-closing position; biasing means normally urging the valve unit to its initial position; and control means interconnecting the valve and the second member for actuating the valve sequentially from initial to intermediate to final position in response to movement of the second member in one direction, including a control element operative upon predetermined movement of the second member in said direction to effect movement of the valve unit to its intermediate position, and further including delayed-action means operative after a predetermined extent of further movement of the second member in the same direction to effect movement of the valve unit from its intermediate position to its final position.

13. In a fluid-pressure control system having a first motor member formed with a chamber and a passage through which fluid may flow to and from the chamber to effect reciprocation of a second motor member within the chamber, valve means for controlling the flow of fluid for sequentially permitting, next restricting and finally stopping such flow, comprising: means providing a port for the passage through which the fluid flows; a first valve movable between a port-opening position to a port-restricting position; means connected between the first valve and the second member and effective in response to a predetermined extent of movement of the second motor member in the chamber to cause movement of said first valve to its port-restricting position; a second valve movable between a port-opening position and a port-closing position; means arranging said valves for initial disposition simultaneously in their port-opening positions; and means connected between the second valve and the second motor member and operative in response to movement of the second motor member in the chamber beyond said predetermined extent to cause movement of said second valve to port-closing position.

14. In a fluid-pressure control system having a first motor member formed with a chamber and a passage through which fluid may flow to and from the chamber to effect reciprocation of a second motor member within the chamber, valve means for controlling the flow of fluid for sequentially permitting, next restricting and finally stopping such flow, comprising: means providing a port for the passage through which the fluid flows; a first valve movable between a port-opening position to a port-restricting position; means connected between the first valve and the second member and effective in response to a predetermined extent of movement of the second motor member in the chamber to cause movement of said first valve to its port-restricting position; a second valve movable relative to the first valve between a port-opening position and a port-closing position; means arranging said valves for initial disposition simultaneously in their port-opening positions; means arranging said valves for sequential movement from their port-opening positions in such order that the first valve moves first to its port-restricting position and then the second valve moves to its port-closing position; and means connected to the valves and operative by the second motor member to cause said sequential movement of the valves by movement of the second motor member in the chamber first to a predetermined extent, to move said first valve to its port-restricting position, and then beyond said predetermined extent to move said second valve to its port-closing position, said last-named means including a delay-producing connection to provide a time interval between port-restriction and port-closing.

EDWARD H. FLETCHER.

No references cited.